(12) United States Patent
Freiser

(10) Patent No.: US 9,067,535 B2
(45) Date of Patent: Jun. 30, 2015

(54) VEHICLE SAFETY DEVICE

(71) Applicant: Erik Dillon Freiser, North Hollywood, CA (US)

(72) Inventor: Erik Dillon Freiser, North Hollywood, CA (US)

(73) Assignee: Erik Dillon Freiser, North Hollywood, CA (US)

( * ) Notice: Subject to any disclaimer, the term of this patent is extended or adjusted under 35 U.S.C. 154(b) by 0 days.

(21) Appl. No.: 13/969,111

(22) Filed: Aug. 16, 2013

(65) Prior Publication Data

US 2014/0092612 A1  Apr. 3, 2014

Related U.S. Application Data

(60) Provisional application No. 61/708,467, filed on Oct. 1, 2012, provisional application No. 61/708,387, filed on Oct. 1, 2012.

(51) Int. Cl.
*B60Q 1/26* (2006.01)

(52) U.S. Cl.
CPC .................... *B60Q 1/2657* (2013.01)

(58) Field of Classification Search
USPC ...................... 362/473, 84, 72, 217
See application file for complete search history.

(56) References Cited

U.S. PATENT DOCUMENTS

| | | | |
|---|---|---|---|
| 4,051,361 | A | 9/1977 | Lichon et al. |
| 4,598,339 | A | 7/1986 | Ainsworth |
| 5,379,197 | A | 1/1995 | Conyers et al. |
| 2004/0213006 | A1 | 10/2004 | Elliott |

FOREIGN PATENT DOCUMENTS

| | | |
|---|---|---|
| CN | 1759031 A | 4/2006 |
| RU | 41835 U1 | 11/2004 |

OTHER PUBLICATIONS

International Search Report mailed Nov. 28, 2013, for International Patent Application No. PCT/UIS2013/056503.
Written Opinion mailed Oct. 23, 2013, for International Patent Application No. PCT/UIS2013/056503.

*Primary Examiner* — Tracie Y Green
(74) *Attorney, Agent, or Firm* — Perkins Coie LLP

(57) ABSTRACT

A vehicle lighting apparatus that can be used to increase the visibility profile of a vehicle is described. The apparatus includes a base adapted to connect to a vehicle frame; a power supply; and an elongated light source supported by the base and coupled to the power supply. The elongated light source is adapted to extend above the vehicle frame with respect to a surface the vehicle frame is to traverse thereon.

23 Claims, 9 Drawing Sheets

VEHICLE SAFETY DEVICE

CROSS-REFERENCE TO RELATED APPLICATION

This application claims the benefits of U.S. Provisional Patent Application Ser. No. 61/708,467, filed Oct. 1, 2012 and U.S. Provisional Patent Application Ser. No. 61/708,387 filed on Oct. 1, 2012, and the subject matters thereof are all incorporated herein by reference in their entirety.

TECHNICAL FIELD

This technology relates generally to a vehicle safety apparatus and, in particular, to a lighting apparatus that can be used to increase the visibility profile of a vehicle.

INTRODUCTION

Wheelchairs, motorcycles, mopeds, and bicycles have profiles that are lower to the ground relative to cars and trucks, with whom these vehicles share a road. Accordingly, these vehicles are known as "low profile vehicles." The result of a low profile is an inability to be recognized by other drivers. Low visibility and an inability to be seen makes low profile vehicles inherently less safe than the taller vehicles the low profile vehicles negotiate with every day in traffic. Because other drivers are unable to see and/or quickly recognize low profile vehicles while driving, these vehicles are subject to a safety disadvantage that frequently results in accidents. Drivers of cars and trucks are often unable to see low profile vehicles until it is too late to avoid a collision. Accidents between low profile vehicles and higher profile cars and trucks can be especially dangerous due to the size differential of the vehicles.

Vehicle safety lights are currently available for vehicles such as motorcycles and bicycles. However, the safety lights for low profile vehicles have a small silhouette and are generally attached to the existing vehicle frame. For example, small light emitting diode (LED) bicycle safety lights are designed to be attached to the frame under the seat. Because bicycles share the road with vehicles with much larger profiles (i.e., riders seated much higher), a safety light positioned in this location serves a limited purpose. Visibility of low profile vehicles is limited because existing safety lights are configured to stay within the profile of the vehicle. Therefore, low profile vehicles are still subject to frequent, dangerous accidents despite the availability of safety lights.

Whip lights and light poles are sometimes used on recumbent bicycles and all-terrain vehicles ("ATVs"). Because of the whip lights' and the light poles' rigid nature, these devices cannot be used on vehicles that require a rider to mount the frame (i.e., bicycle, motorcycle).

DISCLOSURE OF TECHNOLOGY

Introduced herein is an improved vehicle lighting apparatus that can be used to increase the visibility profile of a vehicle, especially mountable vehicles, by a lighting apparatus that rises above a low profile vehicle's frame ("the technology"). Various embodiments of the apparatus described herein include a base adapted to connect to a vehicle frame; a power supply; and an elongated light source supported by the base and coupled, directly or indirectly, to the power supply. The elongated light source is adapted to extend above the vehicle frame with respect to a surface the vehicle frame is to traverse thereon. By extending above the vehicle, the vehicle safety apparatus increases the distance from which the vehicle can be seen.

The vehicle safety apparatus may be adapted for use with a vehicle frame that is adapted for riding. One example of a vehicle frame is a bicycle. In the same embodiment, the elongated light source may be adapted to pivot from the base, such that the entirety, or a portion, of the elongated light source is displaced when sufficient force is applied. The elongated light source may be configured to move upon pressure from a human body and spring back to an original upright position with respect to a surface the vehicle frame is to traverse thereon. In various embodiments, the elongated light source may be constructed of a segmented rigid material linked by flexible material. The vehicle safety apparatus may be configured to warp under a human thigh moving over the elongated light source and unwarp upon removal of the human thigh without breaking the elongated light source.

According to one embodiment, the elongated light source may also be configured to provide illumination in 180 degrees or greater. The elongated light source may be adapted to provide a substantially uniform illumination, an irregular illumination pattern, or any combination thereof. The elongated light source may also comprise an extra row or column of lights that intensify when the rider utilizes the brakes or when the rider turns. The vehicle safety apparatus may be configured such that all of the lights can be intensified together, in programmed patterns, or in random patterns.

According to various embodiments of the technology, the elongated light source may utilize a telescoping mechanism to extend above the vehicle frame when fully protracted. One skilled in the art would appreciate that the elongated light source may be configured to retract into different positions, including into the base.

This Disclosure is provided to introduce a selection of concepts in a simplified form that are further described below in the Detailed Disclosure. Some embodiments of the technology have other aspects, elements, features, and steps in addition to or in place of what is described above. These potential additions and replacements are described throughout the rest of the specification. Other advantages and features of the technology will become apparent when viewed in light of the Detailed Description when taken in conjunction with the attached drawings and claims.

Figure 1A:
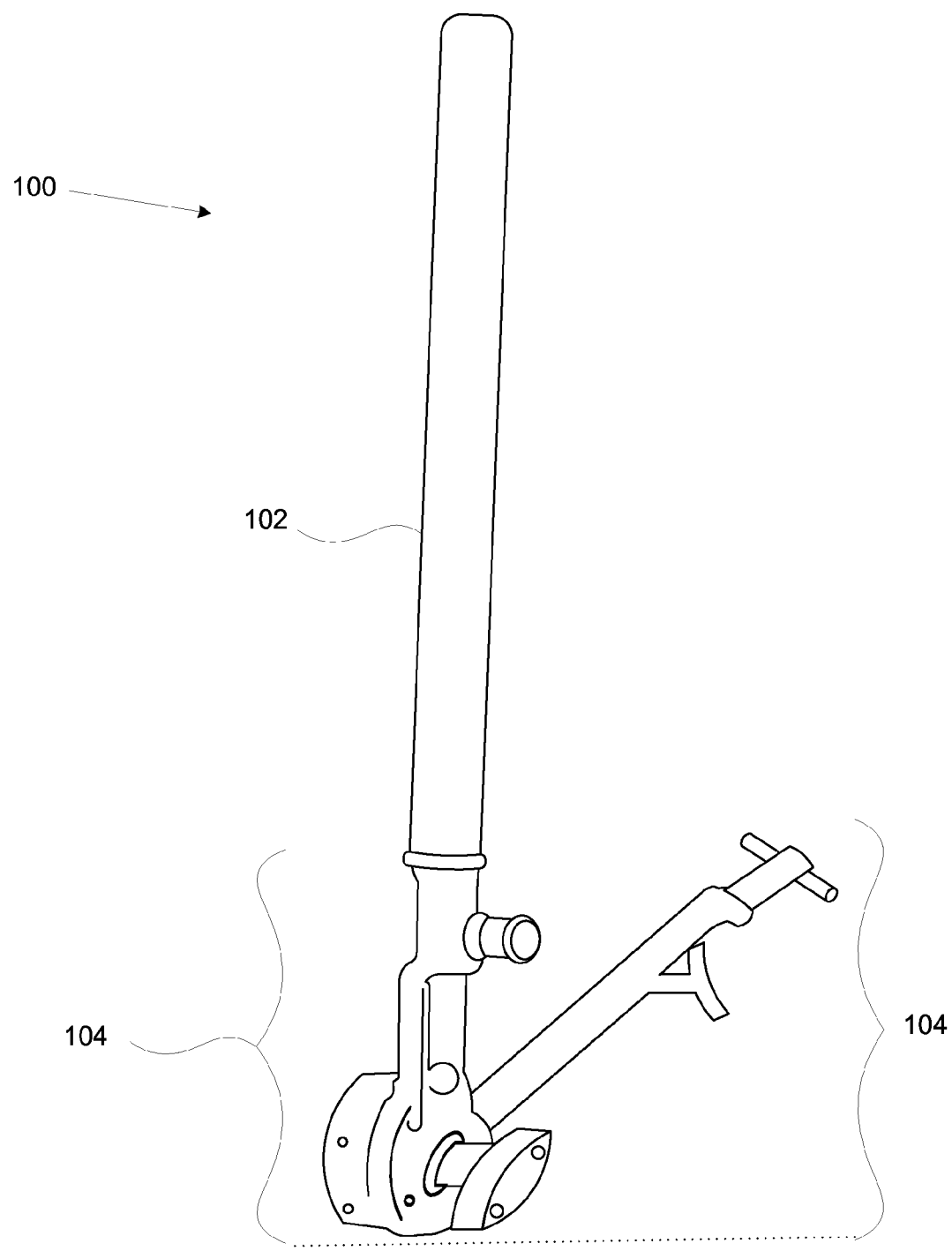
FIG. 1A is a perspective views of a vehicle safety apparatus according to one embodiment of the disclosure.

The figures depict various embodiments of the present technology for purposes of illustration only. One skilled in the art will readily recognize from the following discussion that various embodiments of the structures and methods illustrated herein may be employed without departing from the principles of the technology described herein.

DETAILED DESCRIPTION

Various aspects of the technology will now be described. The following description provides specific details for a thorough understanding and enabling description of these examples. One skilled in the art will understand, however, that the technology may be practiced without many of these details. Additionally, some well-known structures or functions may not be shown or described in detail, so as to avoid unnecessarily obscuring the relevant description. Although the diagrams depict components as functionally separate, such depiction is merely for illustrative purposes. It will be apparent to those skilled in the art that the components portrayed in these figures may be combined or divided into separate components.

The terminology used in the description presented below is intended to be interpreted in its broadest reasonable manner, even though it is being used in conjunction with a detailed description of certain specific examples of the technology. The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1B:
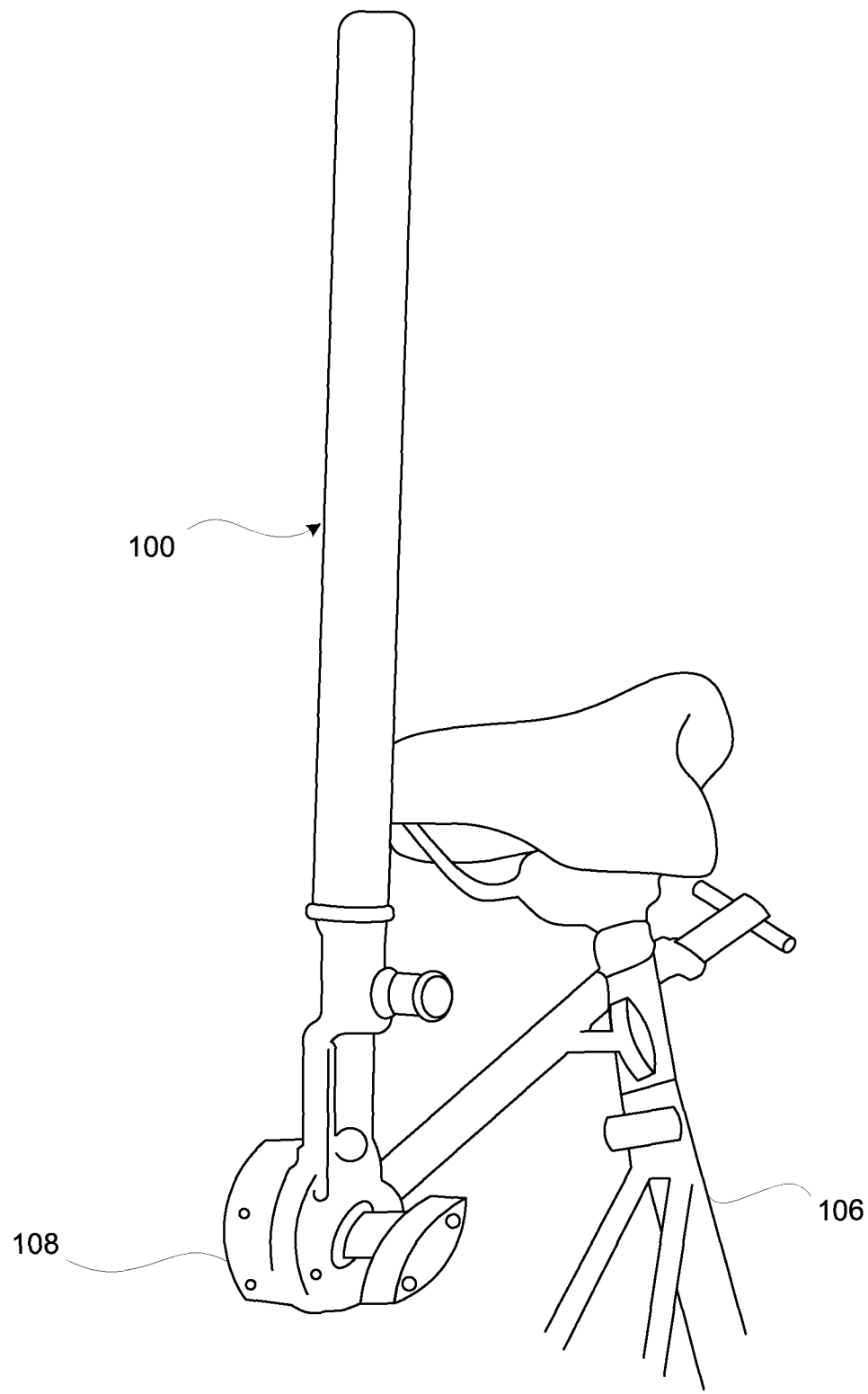
FIG. 1B is a perspective view of the vehicle safety apparatus attached to a vehicle according to the embodiment of FIG. 1A.

FIG. 1A is a perspective views of a vehicle safety apparatus according to one embodiment of the disclosure. FIG. 1B is a perspective view of the vehicle safety apparatus attached to a vehicle according to the embodiment of FIG. 1A. The vehicle safety apparatus 100 shown in FIG. 1A comprises a base 104, a power supply 108, and an elongated light source 102 supported by the base 104 and coupled, directly or indirectly, to the power supply 108. FIG. 1B illustrates the vehicle safety apparatus 100 coupled, directly or indirectly, to a vehicle frame 106 according to one of the preferred embodiments. Illustrated vehicle frame 106 is a bicycle. However, the vehicle frame 106 may be, for example, a bicycle, a wheelchair, a recumbent bicycle, a motorcycle, a moped, a scooter, or a trike, although the vehicle safety apparatus of the present preferred embodiment may be adapted for use with any other suitable vehicle frame. In general, the vehicle frame can be adapted for riding. The base 104 is adapted to connect to the vehicle frame 106. In preferred embodiments, the base 104 is adapted such that the vehicle safety apparatus 100 is positioned at the rear of the vehicle. The base 104 may also be adapted such that the vehicle safety apparatus 100 is positioned to one or more sides, in front of, or above the vehicle. In one preferred embodiment, the base 104 is configured to be detachably connectable to the vehicle frame 106. The detachably connectable mechanism allows a rider to easily store and quickly reconfigure the vehicle safety apparatus 100 in a modular fashion. The base 104 can be made of metal, carbon fiber, (poly)resin, any other rugged, weather-resistant material, or any combination thereof.

The base 104 illustrates a tightening knob for securing onto the vehicle frame 106. However, other mechanisms of securing the elongated light source 102 onto the vehicle frame 106 are also contemplated by this disclosure.

An elongated light source 102 is supported by the base 104 and contains one or more LEDs, although one skilled in the art would recognize that a number of light source configurations (e.g., columnar, circular, zigzag) are available that could perform properly under the described conditions. The LEDs, an alternative light source (e.g., fluorescent emitter, incandescent emitter, phosphorescent emitter), or a combination thereof, may be housed in a translucent (e.g., semi-transparent) or transparent polymeric or plastic column. The housing may have patterns with different degrees of transparency. One skilled in the art would appreciate that many materials allow light to pass through and may be considered appropriate substitutes (e.g., glass). For example, the elongated light source 102 may comprise high powered LEDs housed within a red translucent plastic column. Alternatively, the high powered LEDs can be red. The column of the elongated light source 102 may take various forms, including, but not limited to, a circular column, semi-circular column, rectilinear column, octahedral column, or curved half-parabola column. The light emitters (e.g., LEDs, fluorescent emitter, phosphorescent emitter) may be arranged down the entirety of the column or any portion thereof. Diameter of the elongated light source 102 can vary from less than an inch to several inches. The LEDs may be arranged in columns, rows, a zigzag pattern, various curvilinear, rectilinear or random patterns, or any combination thereof. Although the elongated light source 102 may vary in height from six inches to five feet, the height is preferably substantially near the length of an average human thigh. The vehicle safety apparatus 100 is designed such that the elongated light source 102 rises above the vehicle frame 106 to enhance the visibility of the vehicle in traffic or around pedestrians. The elongated light source 102 may be adapted to extend from at or below the top of the vehicle frame 106.

The elongated light source 102 may be an active light source or a passive light source. For example, the elongated light source may comprise LEDs housed in a translucent plastic column, thereby serving as an active light source. Alternatively, the elongated light source may comprise a reflective material that redirects light from other sources (e.g., headlights from a second vehicle), thereby serving as a passive light source.

The elongated light source 102 is coupled, directly or indirectly, to a power supply 108, examples of which include, but are not limited to, a battery, a dynamo, a solar cell, some other regenerative power source, or any combination thereof. For example, the power supply may be a Joule™ 3 Dynamo Hub or a combination of rechargeable lithium ion or nickel-metal hydride (NiMH) batteries. The power supply 108, for example, may be housed within the column of the elongated light source 102. The vehicle safety apparatus 100 may also utilize the vehicle's existing electrical power system (e.g., wheelchair). In one embodiment, the vehicle safety apparatus 100 may utilize a dynamo to provide a primary source of power and one or more rechargeable batteries that continue to power the elongated light source 102 when the vehicle is not moving. The rechargeable batteries may also be adapted to be recharged via a universal serial bus ("USB") connection to a laptop, desktop computer, tablet, or power outlet converter.

Figure 2A:
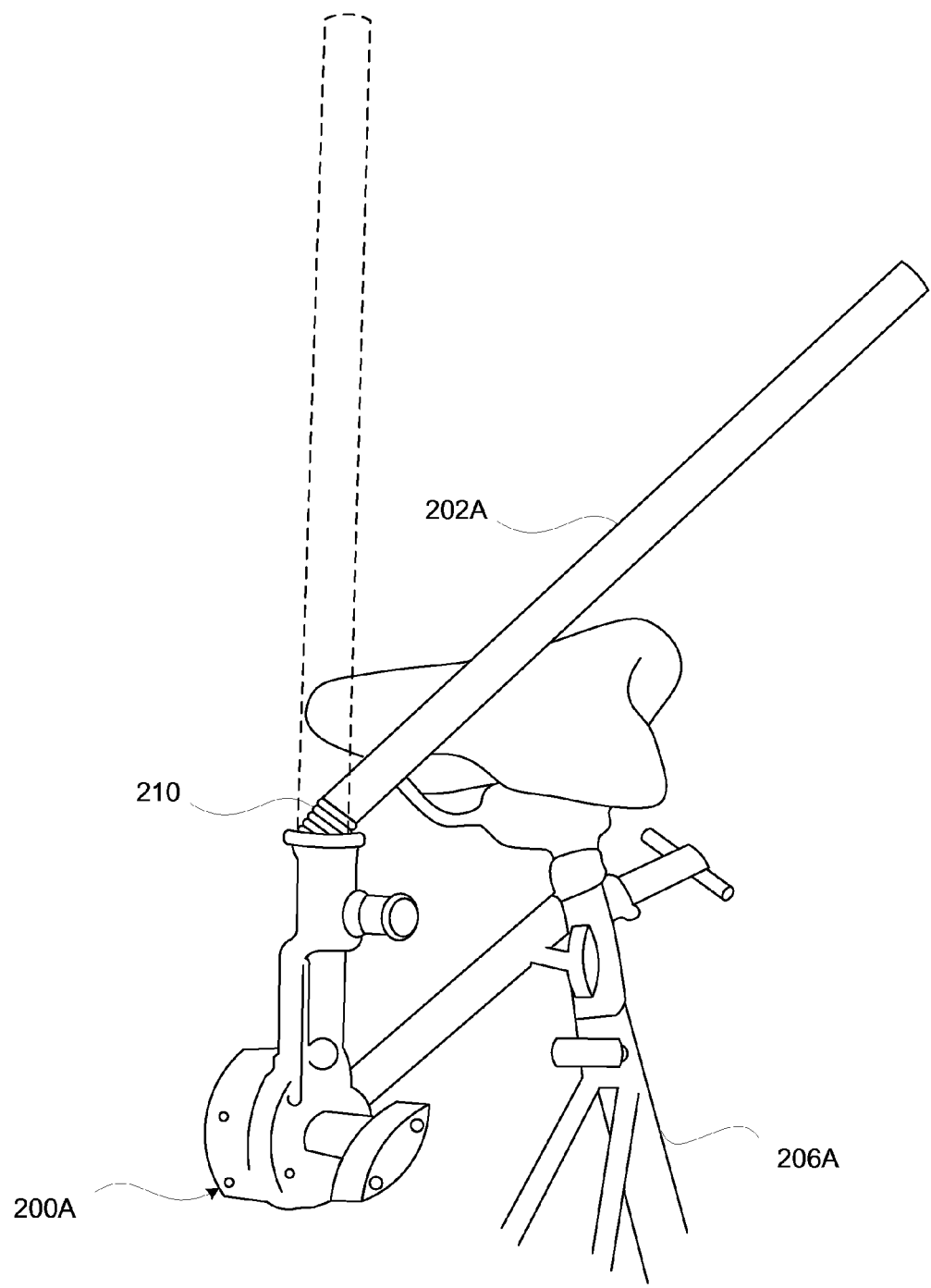
FIG. 2A is a perspective view of a vehicle safety apparatus attached to a vehicle frame according to one embodiment of the disclosure.
Figure 2B:
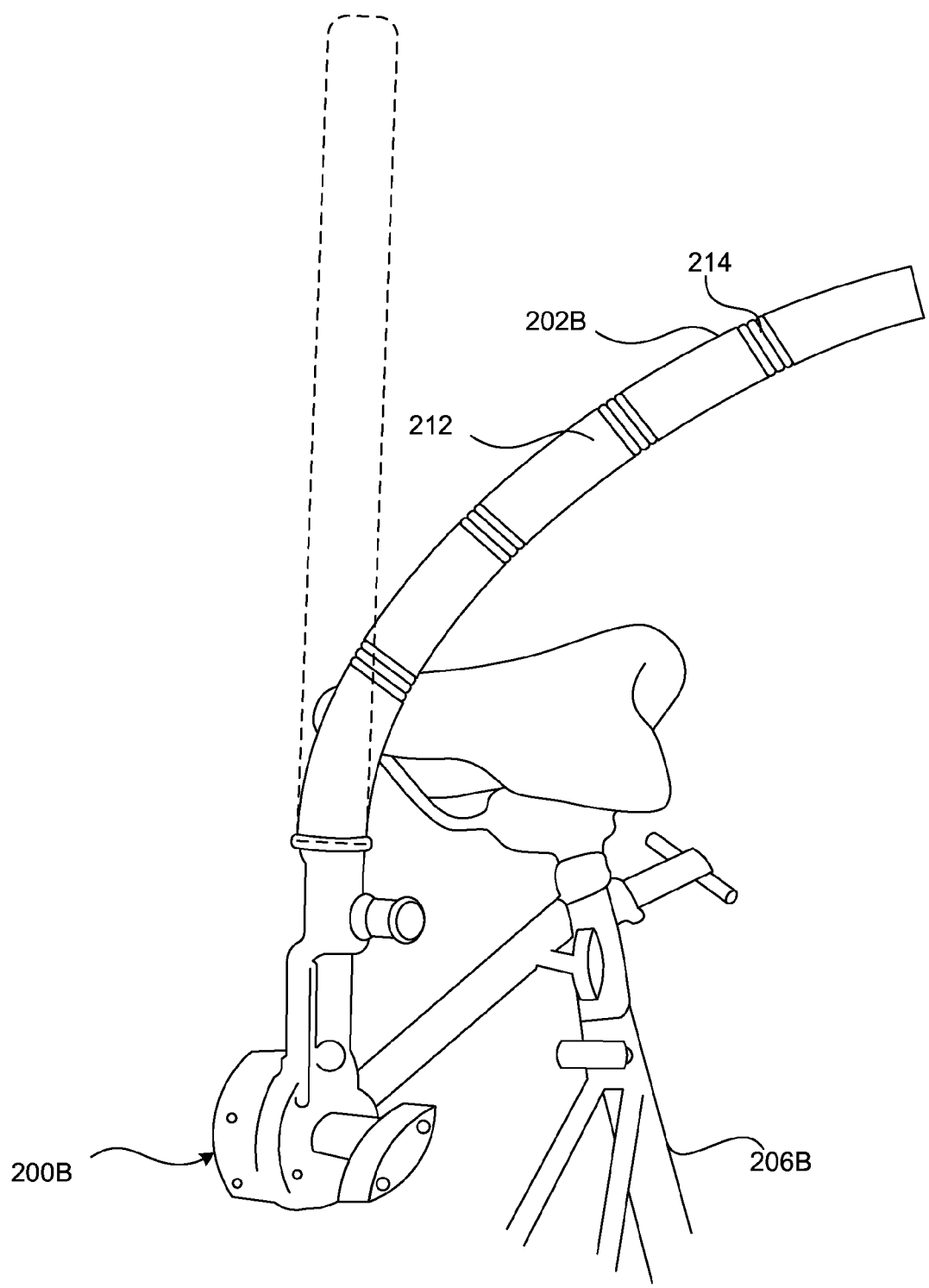
FIG. 2B is a perspective view of a vehicle safety apparatus attached to a vehicle frame according to another embodiment of the disclosure.

FIG. 2A is a perspective view of a vehicle safety apparatus 200A attached to a vehicle frame 206A according to one embodiment of the disclosure. FIG. 2B is a perspective view of a vehicle safety apparatus 200B attached to a vehicle frame 206B according to another embodiment of the disclosure. The vehicle safety apparatus 200A and the vehicle safety apparatus 200B may collectively be referred to as "the vehicle safety apparatus 200," and the vehicle frame 206A and the vehicle frame 206B may collectively be referenced as the vehicle frame 206, which is adapted for a rider. The vehicle safety apparatus 200, for example, can be the vehicle safety apparatus 100 of FIG. 1A. The vehicle safety apparatus 200, preferably, is configured to be flexible. The flexible mechanism may be implemented in a variety of ways including, but not limited to, the embodiments of FIGS. 2A and 2B. In one embodiment, the elongated light source 202A may be entirely inflexible. For example, the elongated light source 202A may be adapted to pivot from the base 204, as shown in FIG. 2A, such that the entirety of the elongated light source 202A is displaced when sufficient force is applied. Examples of a pivot mechanism 210 include, but are not limited to, a central pivot joint, a universal joint, and bellows made from metal and/or plastic.

In the embodiment illustrated in FIG. 2B, the elongated light source 202B may be constructed of a segmented rigid material linked by flexible material. The flexible material may be selected to warp under a human thigh moving over the elongated light source 202B and unwarp upon removal of the human thigh without breaking the elongated light source 202B.

Illustrated in FIG. 2A and FIG. 2B are examples of making the vehicle safety apparatus 200 flexible enough for a rider to mount over the vehicle safety apparatus 200. Other embodiments of the vehicle safety apparatus 200 are also contemplated in this disclosure in any combination of the elongated light source 202 being a rigid pole, a semi-flexible pole, or a flexible pole and the base 204 being a flexible, pivoting, or rigid.

Figure 3A:
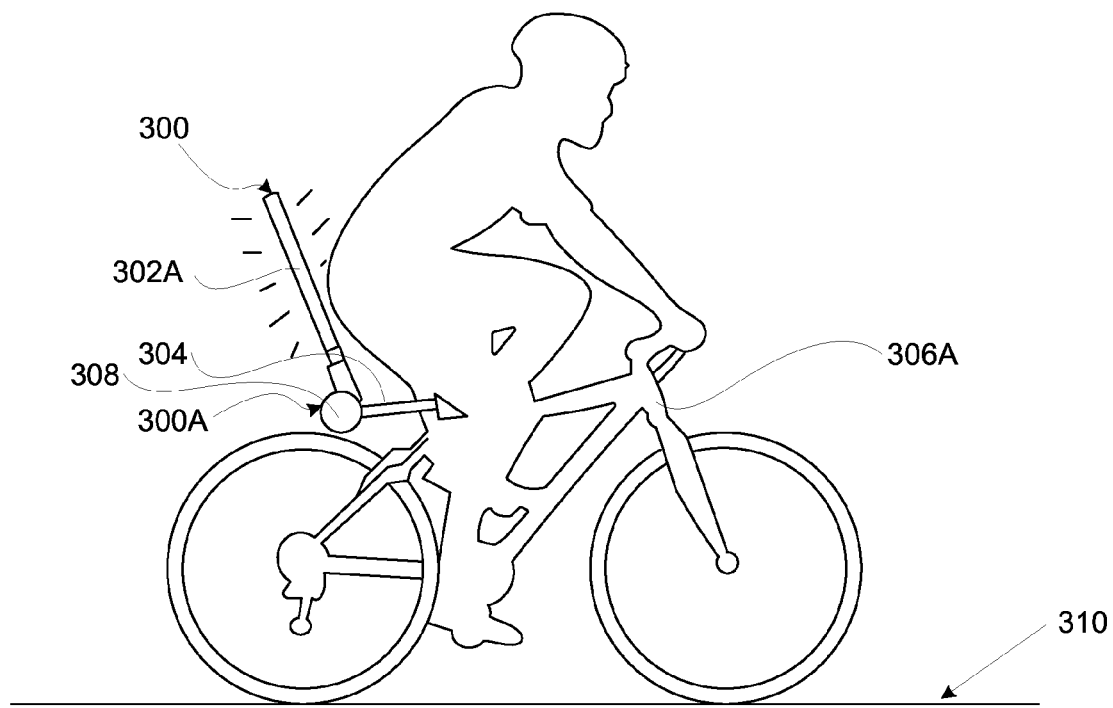
FIG. 3A is a perspective view of a vehicle safety apparatus attached to a vehicle according to one embodiment of the disclosure.

FIG. 3A is a perspective view of a vehicle safety apparatus 300A attached to a vehicle according to one embodiment of the disclosure. The vehicle safety apparatus 300A, for example, can be the vehicle safety apparatus 100 of FIG. 1A. The vehicle safety apparatus 300A is configured to mount to a vehicle frame 306A. The illustrated vehicle frame 306A is a bicycle frame; however, other possible vehicles include, but are not limited to, a wheelchair, a recumbent bicycle, or a trike. The vehicle safety apparatus 300A comprises a base 304 adapted to connect to a vehicle frame 306A, a power supply 308, and an elongated light source 302A supported by the base 304 and coupled, directly or indirectly, to the power supply 308. The base 304 is adapted to connect to a particular vehicle frame 306A, for example, a bicycle. The base 304 may be detachably connectable or permanently mountable to the vehicle frame 306A.

In one embodiment, the elongated light source 302A is adapted to extend above the vehicle frame 306A with respect to a surface 310 the vehicle frame is to traverse thereon. This extension raises the vehicle's visibility profile, improves the rider's visibility and safety, and reduces the incidence of collisions with other vehicles. The elongated light source 302A can be configured to provide light within the profile of the vehicle (i.e., inside the frame 306A). In another embodiment, the elongated light source 302A is adapted to provide illumination in 180 degrees or greater; however, the elongated light source 302A may, for example, be adapted to provide illumination in any range between 180 and 360 degrees. The elongated light source 302A may be adapted to provide a substantially uniform illumination, an irregular illumination pattern, or any combination thereof. In the preferred embodiment shown in FIG. 3A, the elongated light source 302A is configured to move upon pressure from a human body and spring back to an original upright position with respect to the surface 310 the vehicle frame 306A is to traverse thereon.

Figure 3B:
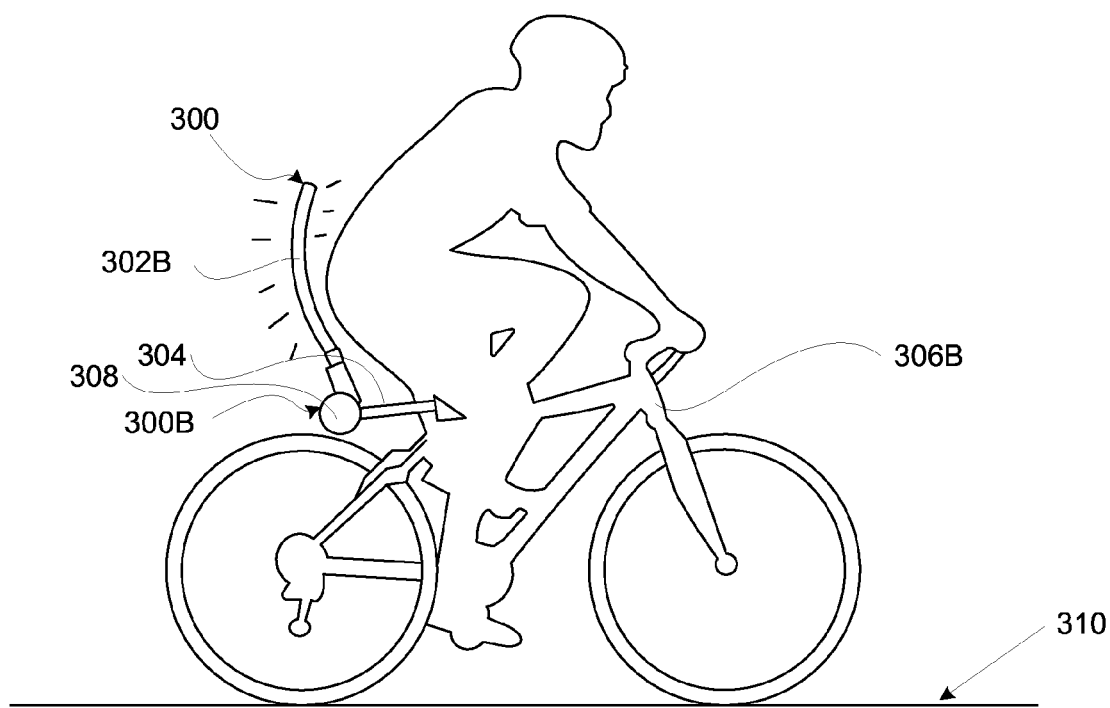
FIG. 3B is a perspective view of a vehicle safety apparatus attached to a vehicle according to another embodiment of the disclosure.

FIG. 3B is a perspective view of a vehicle safety apparatus attached to a vehicle according to another embodiment of the disclosure. In various embodiments, the elongated light source 302B may be a flexible curved column. In this embodiment, the elongated light source 302B can be configured to move upon pressure from a human body and spring back to an original upright position with respect to the surface 310 the vehicle frame 306B is to traverse thereon. Alternatively, the elongated light source 302B can be constructed of a segmented rigid material linked by flexible material. The flexible material may be selected to warp under a human thigh moving over the elongated light source 302B and unwarp upon removal of the human thigh without breaking the elongated light source 302B.

Figure 3C:
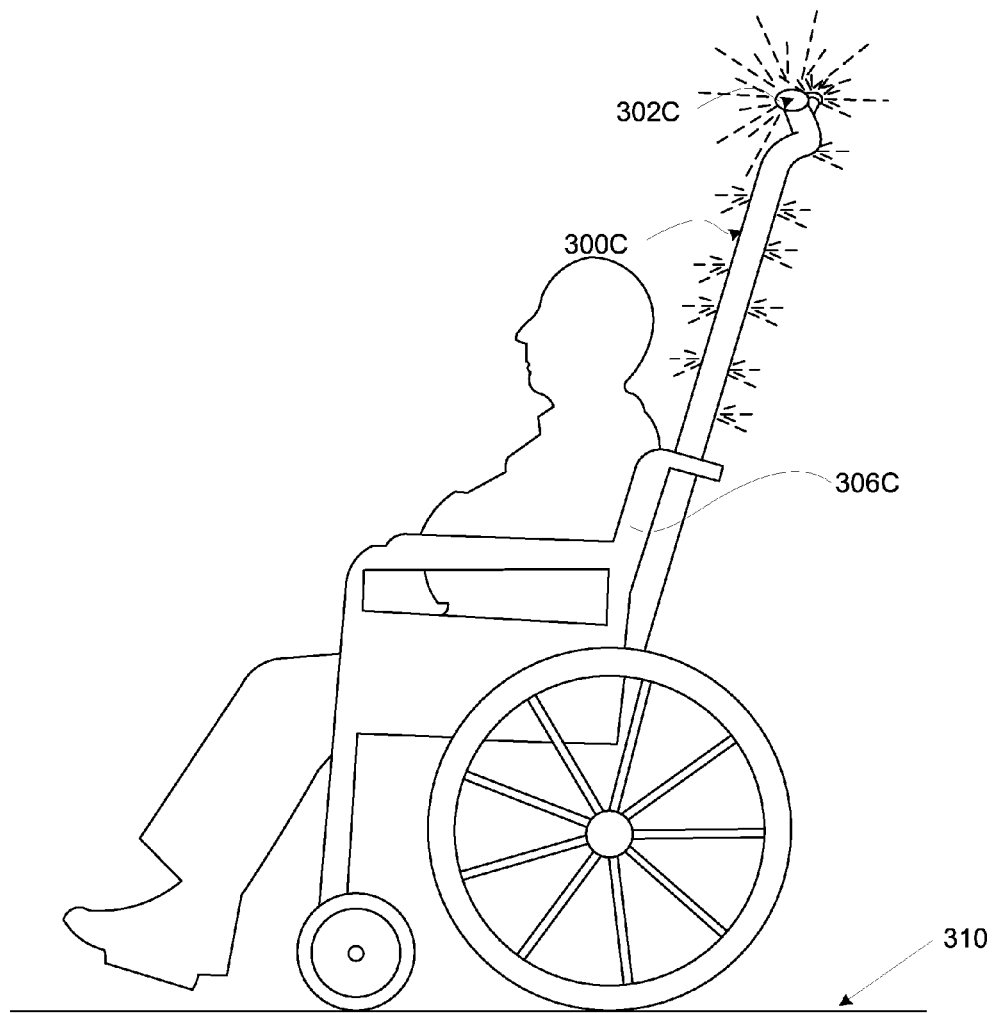
FIG. 3C is a side view of a vehicle safety apparatus attached to a vehicle according to another embodiment of the disclosure.

FIG. 3C is a side view of a vehicle safety apparatus attached to a vehicle according to another embodiment of the disclosure. The illustrated vehicle frame 306C is a wheelchair; however, other possible vehicles include, but are not limited to, a bicycle, a recumbent bicycle, or a trike. In one embodiment, the elongated light source 302C is adapted to extend above the vehicle frame with respect to a surface 310 the vehicle frame is to traverse thereon. In various embodiments, the elongated light source may be configured in a "Y" shape, wherein the arms of the "Y" comprise the elongated light source 302C. The elongated light source 302C of FIG. 3C is adapted to provide illumination in 180 degrees or greater; however, the elongated light source 302C may, for example, be adapted to provide illumination in any range between 180 and 360 degrees. The elongated light source 302C may be adapted to provide a substantially uniform illumination, an irregular illumination pattern, or any combination thereof. Similarly, the elongated light source 302C may also be adapted such that the arms of the "Y" can be intensified together, in programmed patterns, or in random patterns. In various embodiments, the elongated light source 302C may be configured to illuminate the entire stem of the "Y." Alternatively, the elongated light source 302C may be configured to illuminate only a portion of the stem or may be placed at the top of the vehicle safety apparatus 300C.

Figure 4:
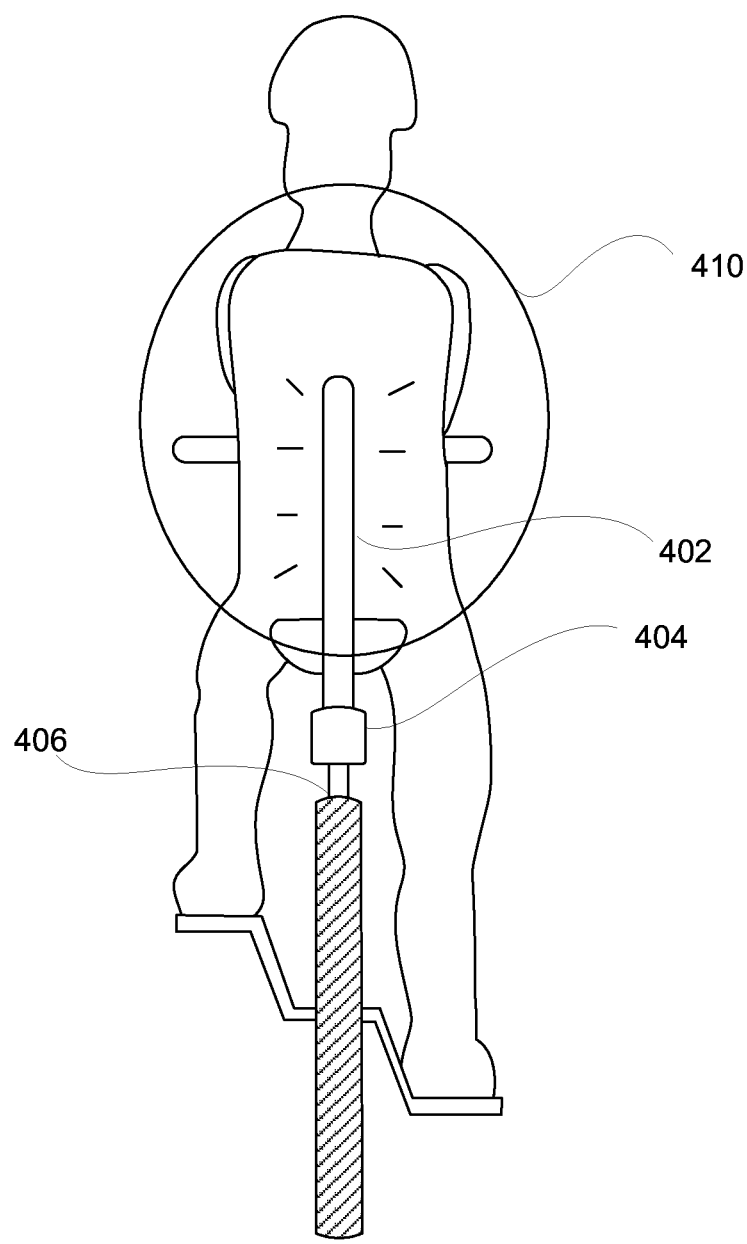
FIG. 4 illustrates an example of the improved visibility profile due to the presence of a vehicle safety apparatus according to one embodiment of the disclosure.

FIG. 4 illustrates an example of the improved visibility profile due to the presence of a vehicle safety apparatus according to one embodiment of the disclosure. In this embodiment, the elongated light source 402 is positioned to provide illumination towards a rider seat of the vehicle such that reflected rays from a rider are adapted to create a larger illumination field 410. The elongated light source 402 may provide uniform illumination or the elongated light source 402 may provide an irregular illumination pattern such that the reflected rays provide a softer, more natural illumination field 410. A larger illumination field 410 can raise the vehicle's visibility profile, thereby improving visibility of the vehicle and reducing the incidence of collisions with other vehicles. Light source intensity may be chosen and/or modified in order to increase visibility at large distances. The base 404 may be adapted to allow adjustment of the vehicle safety apparatus 400 in any direction (e.g., tilt). The vehicle safety apparatus 400 may also be adapted to allow attachment of off-the-shelf safety lights or a specially-designed light to the top and/or side of the apparatus.

In some embodiments, the vehicle safety apparatus 400 may be controlled by the rider via a remote control. The remote control allows the rider to turn the vehicle safety apparatus on/off and cycle through a variety of modes, including, but not limited to, constant on, constant rate of blinking, random blinking, and off. The elongated light source 402 may also comprise an extra row or column of lights that intensify when the rider utilizes the brakes. The elongated light source 402 may also be adapted such that all of the lights can be intensified together, in programmed patterns, or in random patterns. In some embodiments, the vehicle safety apparatus 400 may comprise two or more elongated light sources 402 mounted adjacently or in other symmetrical or non-symmetrical relationships. If two or more vehicle safety apparatuses 400 are coupled, directly or indirectly, together, the elongated light sources 402 may be configured to flash or illuminate any pattern in unison.

In various embodiments, the vehicle safety apparatus 400 may be configured to sync to a vehicle's brake and/or turn lights. Possible vehicles include, but are not limited to, a motorcycle, a bicycle, or a moped. For example, the elongated light source 402 may intensify when a rider is braking or activate side portions of the elongated light source 402 to indicate turn direction. The vehicle safety apparatus 400 may be synced, wired or wirelessly, to additional safety lights positioned elsewhere on the vehicle frame 406 and/or rider (e.g., back of helmet). The elongated light source 402 may also be adapted to provide different color signals for different functions. For example, red LEDs may indicate braking, while yellow LEDs may indicate turn direction.

Figure 5:
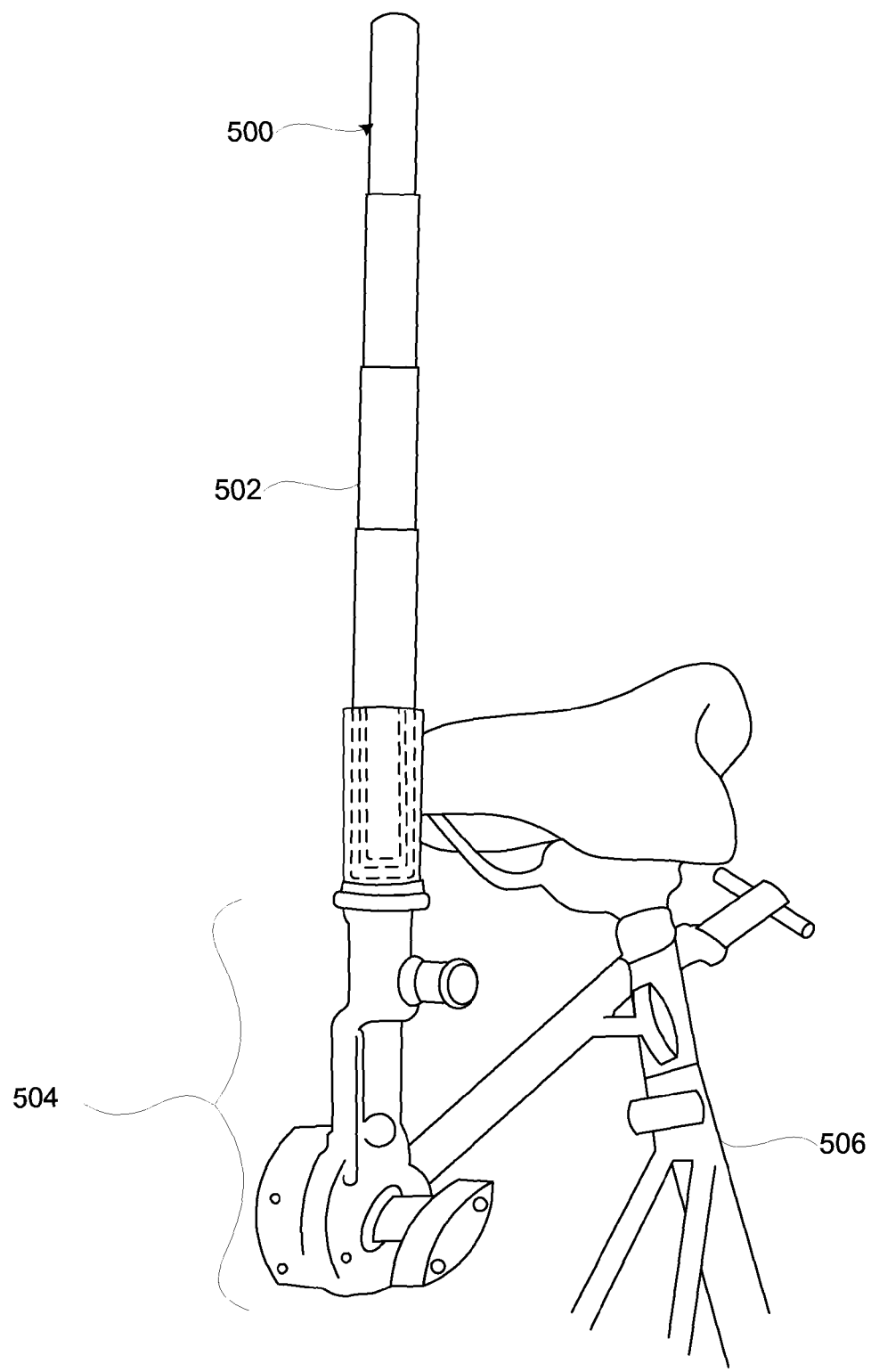
FIG. 5 is a perspective view of a vehicle safety apparatus according to one embodiment of the disclosure.

FIG. 5 is a perspective view of a vehicle safety apparatus according to one embodiment of the disclosure. FIG. 5 illustrates a vehicle safety apparatus 500 and vehicle frame 506 according to one of the preferred embodiments. The vehicle safety apparatus 500, for example, can be the vehicle safety apparatus 100 of FIG. 1A. The illustrated vehicle frame 506 is a bicycle frame; however, other possible vehicles include, but are not limited to, a bicycle, a wheelchair, a recumbent bicycle, a motorcycle, a moped, a scooter, or a trike. In this embodiment, the elongated light source 502 includes a telescoping mechanism such that the elongated light source 502 is configured to extend above the vehicle frame 506 when fully protracted. One skilled in the art would appreciate that the elongated light source 502 may be configured to retract into different positions, including into the base 504.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the technology and its practical application, thereby enabling others skilled in the relevant art to understand the claimed subject matter, the various embodiments and with various modifications that are suited to the particular use contemplated.

The teachings of the disclosure provided herein can be applied to other systems, not necessarily the system described above. The elements and acts of the various embodiments described above can be combined to provide further embodiments.

While the above description describes certain embodiments of the technology, and describes the best mode contemplated, no matter how detailed the above appears in text, the technology can be practiced in many ways. Details of the apparatus may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless the Detailed Description section explicitly defines such terms. Accordingly, the actual scope of the technology encompasses not only the disclosed embodiments, but also all equivalent ways of practicing or implementing the technology under the claims.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The language used in the specification has been principally selected for readability and instructional purposes, and it may not have been selected to delineate or circumscribe the inventive subject matter. It is therefore intended that the scope of the technology be limited not by this detailed description, but rather by any claims that issue on an application based hereon. Accordingly, the disclosure of the embodiments of the technology is intended to be illustrative, but not limiting, of the scope of the technology, which is set forth in the following claims.

What is claimed is:

1. An apparatus for vehicle safety comprising:
a base that is detachably connectable to a vehicle frame of a vehicle through the use of a quick release mechanism;
a power supply; and
an elongated light source supported by the base and coupled to the power supply that extends above the vehicle frame in a vertical orientation with respect to a surface the vehicle frame is to traverse thereon and moves upon experiencing pressure, wherein upon removal of said pressure the elongated light source returns to the vertical orientation.

2. The apparatus of claim 1, wherein the elongated light source is movable along at least two planes.

3. The apparatus of claim 1, wherein the vehicle frame is adapted for riding and wherein the elongated light source is configured to be flexible.

4. The apparatus of claim 3, wherein the elongated light source comprises flexible material selected to warp under a human thigh that is moving over the elongated light source and to unwarp upon removal of the human thigh, thereby returning the elongated light source to the vertical orientation without breaking.

5. The apparatus of claim 1, wherein the vehicle frame is adapted for riding and wherein the elongated light source is adapted to pivot from the base.

6. The apparatus of claim 1, wherein the elongated light source is arranged in a columnar manner.

7. The apparatus of claim 1, wherein the power supply is adapted to be powered by a battery, a dynamo, a solar cell, other regenerative power source, or any combination thereof.

8. The apparatus of claim 1, further comprising a signal transmitter configured to send a synchronization signal that matches an illumination pattern of the elongated light source with one or more additional light sources.

9. The apparatus of claim 1, further comprising a signal receiver configured to receive a pattern change signal based on a rider operation of the vehicle and cause a modification of an illumination pattern of the elongated light source based on the rider operation.

10. An apparatus comprising:
a power supply;
a base that is detachably connectable to a vehicle frame; and
an elongated light source, supported by the base and coupled to the power supply, adapted to provide illumination in 180 degrees or greater, and extend above the vehicle frame in a vertical orientation with respect to a surface the vehicle frame is to traverse thereon, and move upon experiencing pressure, wherein upon removal of said pressure the elongated light source returns to the vertical orientation.

11. The apparatus of claim 10, wherein the elongated light source is adapted to provide a substantially uniform illumination.

12. The apparatus of claim 10, wherein the elongated light source includes light emitting diodes.

13. The apparatus of claim 10, wherein the elongated light source is adapted to provide illumination in 360 degrees.

14. The apparatus of claim 10, wherein the elongated light source is positioned to emit light towards a seat of the vehicle frame such that light reflected by a rider in the seat creates a larger illumination field.

15. The apparatus of claim 10, wherein the elongated light source is movable along at least two planes.

16. The apparatus of claim 10, wherein all or substantially all of the elongated light source is illuminated, either by emitting light generated by a light emitter housed within the elongated light source or reflecting light emitted by a distinct light source.

17. An apparatus comprising:
a power supply;
a base that is detachably connectable to a vehicle frame of a vehicle; and
an elongated light source, supported by the base and coupled to the power supply, that includes a telescoping mechanism that allows the elongated light source to extend above the vehicle frame in a vertical orientation when fully protracted and moves upon experiencing pressure, wherein upon removal of said pressure the elongated light source returns to the vertical orientation.

18. The apparatus of claim 17, wherein the telescoping mechanism is configured to retract into the base.

19. The apparatus of claim 17, wherein the elongated light source is attached to the base via a pivot mechanism and pivotable along at least two planes.

20. The apparatus of claim 17, wherein the entirety or a portion of the elongated light source is flexible.

21. The apparatus of claim 17, wherein the power supply for the elongated light source is rechargeable.

22. The apparatus of claim 17, wherein the vehicle is a bicycle, a wheelchair, a recumbent bicycle, a motorcycle, a moped, a scooter, an all-terrain vehicle, or a trike.

23. The apparatus of claim 1, wherein all or substantially all of the elongated light source is illuminated, either by emitting light generated by a light emitter housed within the elongated light source or reflecting light emitted by a distinct light source.

* * * * *